United States Patent [19]
Saito

[11] Patent Number: 5,438,450
[45] Date of Patent: Aug. 1, 1995

[54] OPTICAL SCANNING APPARATUS

[75] Inventor: Hiroshi Saito, Yokohama, Japan

[73] Assignee: Canon Kabushiki Kaisha, Tokyo, Japan

[21] Appl. No.: 330,612

[22] Filed: Oct. 28, 1994

Related U.S. Application Data

[63] Continuation of Ser. No. 172,903, Dec. 27, 1993, abandoned.

[30] Foreign Application Priority Data

Dec. 29, 1992 [JP] Japan .................. 4-361589

[51] Int. Cl.6 .................... G02B 26/08
[52] U.S. Cl. .................... 359/216; 359/196
[58] Field of Search .................... 359/216–219, 359/205, 206–209, 204, 196; 250/234–236

[56] References Cited

U.S. PATENT DOCUMENTS

| | | | |
|---|---|---|---|
| 4,383,755 | 5/1983 | Fedder et al. | 359/217 |
| 4,758,059 | 7/1988 | Sakuma | 359/205 |
| 4,978,977 | 12/1990 | Ohmori et al. | 359/205 |
| 5,044,710 | 9/1991 | Iwai et al. | 359/205 |
| 5,064,262 | 11/1991 | Matsumoto et al. | 359/205 |

FOREIGN PATENT DOCUMENTS

| | | | |
|---|---|---|---|
| 0526846 | 2/1993 | European Pat. Off. | 359/217 |
| 1-153515 | 10/1989 | Japan . | |
| 0289811 | 11/1990 | Japan | 359/205 |
| 0054513 | 3/1991 | Japan | 359/205 |
| 0131817 | 6/1991 | Japan | 359/217 |
| 4-14734 | 4/1992 | Japan . | |
| 92004652 | 3/1992 | WIPO | 359/205 |

*Primary Examiner*—Loha Ben
*Assistant Examiner*—Steve Kong
*Attorney, Agent, or Firm*—Fitzpatrick, Cella, Harper & Scinto

[57] ABSTRACT

In an optical scanning apparatus, a light beam from a light source is deflected by a deflector and the deflected light beam is converged on a scanning surface by an optical system. The light beam from the optical system is reflected by a reflecting element such that the reflected light beam has an angle with respect to a main scanning surface. The reflected beam is detected. When a distance from a deflection point of the deflector to the scanning surface along a direction of an optical axis of the optical system is L, a distance from the deflection point to a lens surface of the optical system at a position closest to the scanning surface is A, and a maximum distance from the deflection point to the reflecting element is B, the condition $0 < (B-A)/L < 0.2$ is satisfied.

8 Claims, 3 Drawing Sheets

OPTICAL SCANNING APPARATUS

This application is a continuation of application Ser. No. 08/172,903 filed Dec. 27, 1993, now abandoned.

BACKGROUND OF THE INVENTION

1. Field of the Invention

The present invention relates to an optical scanning apparatus and, more particularly, to an optical scanning apparatus suitable for an apparatus such as a laser beam printer (LBP) or a laser beam copying machine, in which, when a light beam (also called as a beam) optically modulated on the basis of recording image information and emitted from a light source means is guided onto the scanning surface of a photosensitive drum or the like through a deflecting means (optical deflector) such as a rotary polygon mirror and a focusing means to be optically scanned, each element of a synchronous detecting system for receiving part of the light beam from the focusing means to set a scanning start position on the scanning surface is appropriately set, thereby performing high-precision optical scanning.

2. Related Background Art

In an optical scanning apparatus such as a laser beam printer (LBP), conventionally, image recording is performed by using a method proposed in, e.g., Japanese Patent Publication No. 62-36210. That is, a light beam optically modulated on the basis of an image signal and emitted from a light source means is periodically deflected by an optical deflector comprising, e.g., a polygon mirror. The light beam is focused on a photosensitive recording medium by a focusing optical system having an f-θ characteristic to form a spot and optically scanned, thereby performing image recording.

FIGS. 1 and 2 are a perspective view showing the main part of a conventional optical scanning apparatus and a sectional view showing the main part in a sub-scanning direction, respectively.

Referring to FIG. 1, a light beam (divergent beam) emitted from a light source means 51 is collimated by a collimator lens 52 into a parallel beam. The beam (light amount) is regulated by a stop 53 provided near the collimator lens 52 and incident on a cylindrical lens 54 having a predetermined refracting power in only the sub-scanning direction.

On a main scanning surface where the beam is deflected and scanned, part of the parallel beam incident on the cylindrical lens 54 emerges in the parallel beam state. On the sub-scanning surface perpendicular to the main scanning surface, the beam is focused to form a substantially linear image on a reflection surface (polygon surface) 55a of an optical deflector 55 comprising a polygon mirror.

The light beam reflected and deflected on the reflection surface 55a of the optical deflector 55 is guided onto a photosensitive drum surface (scanning surface) 57 through an f-θ lens system (focusing optical system) 56 comprising a spherical lens 56a and a toric lens 56b and having an f-θ characteristic.

The f-θ lens system 56 converts the light beam passing through the optical deflector 55 and deflected and scanned at a constant angular velocity such that the light spot is scanned at a constant speed on the photosensitive drum surface 57.

When the optical deflector 55 is rotated by a motor 61 serving as a driving means in a direction indicated by an arrow 55b, the photosensitive drum surface 57 is optically scanned in a direction indicated by an arrow 57a, thereby performing image information recording.

At this time, the light spot on the photosensitive drum surface 57 is repeatedly optically scanned in the direction indicated by the arrow 57a. However, if a dividing error is present on the reflection surface of the optical deflector 55, the timing of repeatedly optically scanning the light beam to write the image information is shifted.

In the conventional optical scanning apparatus, in order to adjust the timing of the scanning start position on the photosensitive drum surface 57 before optical scanning on the photosensitive drum surface 57, the light beam at the distal end portion (image noneffective portion), which is deflected and scanned by the optical deflector 55, is reflected by a fixed reflecting mirror 58 and guided by a focusing lens 59 to a detecting means 60 for detecting the scanning start position. By using a signal obtained from the detecting means 60, the timing of the scanning start position for image recording onto the photosensitive drum surface 57 is adjusted.

Referring to FIG. 2, the light beam on the sub-scanning section is focused on a deflection point (reflection position) X on the reflection surface 55a of the optical deflector 55 through the cylindrical lens 54 as described above.

The deflection point X and the photosensitive drum surface Y are optically almost conjugate to each other on the sub-scanning section by the f-θ lens system 56. Therefore, even if the reflection surface 55a is inclined with respect to a rotating shaft 62 on the sub-scanning section (that is, plane inclination occurs), the light beam is focused on the same scanning line on the photosensitive drum surface Y. An optical system for correcting so-called plane inclination of the reflection surface of the optical deflector 55 is thus constituted.

In order to obtain desired optical performance in the conventional optical scanning apparatus, for example, strict optical precision for the position or a change-with-time of each optical element constituting the optical scanning apparatus shown in FIG. 1 is required.

For this reason, in the conventional optical scanning apparatus, as a means for ensuring high precision, for example, a member called as an optical box which integrates all elements other than the photosensitive drum is attached to the apparatus to meet the above requirement.

The optical box is preferably as small as possible to realize a compact optical scanning apparatus.

In the conventional optical scanning apparatus, the fixed reflecting mirror 58 is provided as part of the synchronous detecting system for detecting the scanning start position on the scanning surface to appropriately bend the optical path, thereby realizing a compact apparatus.

However, as shown in FIG. 1, when the fixed reflecting mirror 58 is disposed near, e.g., the toric lens 56b, the light beam for detecting the scanning start position directed from the reflecting mirror 58 to the focusing lens 59 (referred to as a detecting light beam thereafter) passes near the toric lens 56b. At this time, part of the detecting light beam is reflected on a lens surface (exit surface) 56b1 of the toric lens 56b to generate stray light. This stray light is incident on the photosensitive drum surface 57 to generate so-called ghost or flare light. The stray light is also incident on the detecting means to generate noise to degrade optical scanning precision and the image quality.

If the distance (optical path length) from the toric lens 56b to the reflecting mirror 58 is shortened, the optical path from the reflecting mirror 58 to the focusing lens 59 is elongated, so that the size of the optical box in a direction perpendicular to the optical axis on the main scanning surface is elongated.

This makes it very difficult to guide the optical path. For example, when the synchronous detecting system is constituted by a plurality of reflecting mirrors, the peripheral portion of the optical deflector is excessively complicated, so that a desired compact apparatus can hardly be realized.

SUMMARY OF THE INVENTION

It is an object of the present invention to provide an optical scanning apparatus in which a reflecting means for guiding a detecting light beam to a detecting means constituting a synchronous detecting system for controlling a-scanning start position on a scanning surface is appropriately arranged, thereby minimizing reflection of the detecting light beam on the last lens surface of a focusing means to prevent noise light from being incident on the detecting means, and at the same time, realizing a compact apparatus capable of performing high-precision optical scanning.

The optical scanning apparatus of the present invention is characterized in that, when a light beam emitted from light source means is guided to deflecting means through optical means, and the light beam reflected and deflected by the deflecting means is guided to a scanning surface by focusing means to perform optical scanning, part of the light beam passing through the focusing means is incident on detecting means for detecting a scanning start position on the scanning surface through reflecting means such that part of the optical path of the light beam has an angle with respect to a main scanning surface where the light beam is optically scanned by the deflecting means, and the following condition is satisfied:

$$0 < (B-A)/L < 0.2$$

where L is a distance from a deflection point of the deflecting means along a direction of an optical axis of the focusing means, A is a distance from the deflection point to a lens surface of the focusing means at a position closest to the scanning surface, and B is a maximum distance from the deflection point to the reflecting means.

Especially, the reflecting means has a plurality of reflecting mirrors disposed in the optical path between the focusing means and the detecting means.

DETAILED DESCRIPTION OF THE PREFERRED EMBODIMENTS

Figure 1:
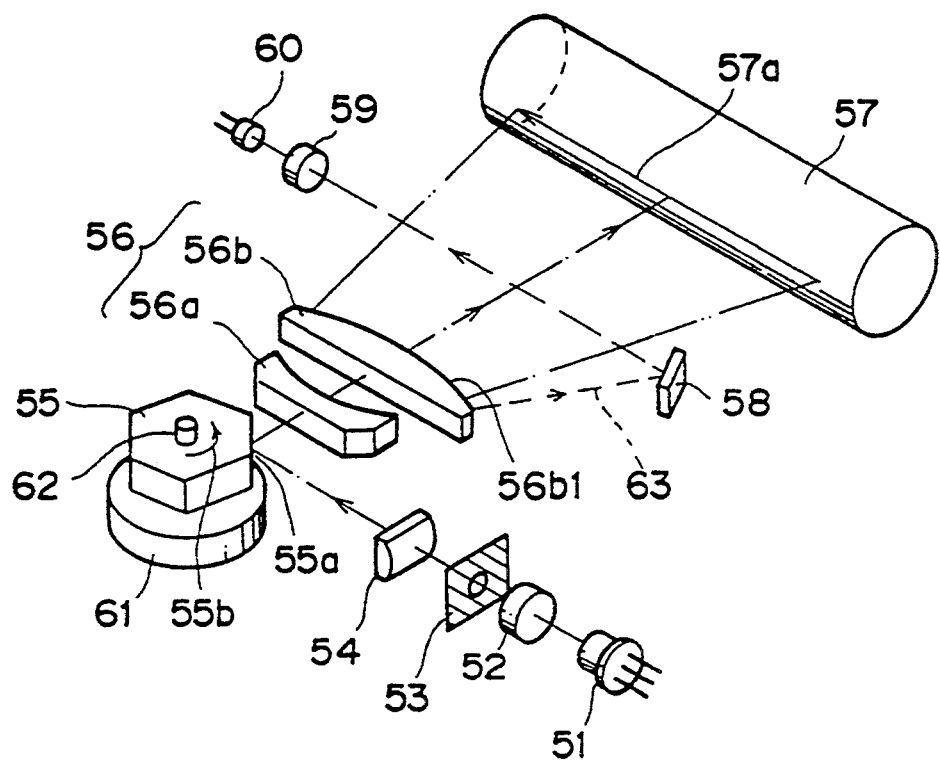
FIG. 1 is a perspective view showing the main part of a conventional optical scanning apparatus.
Figure 2:
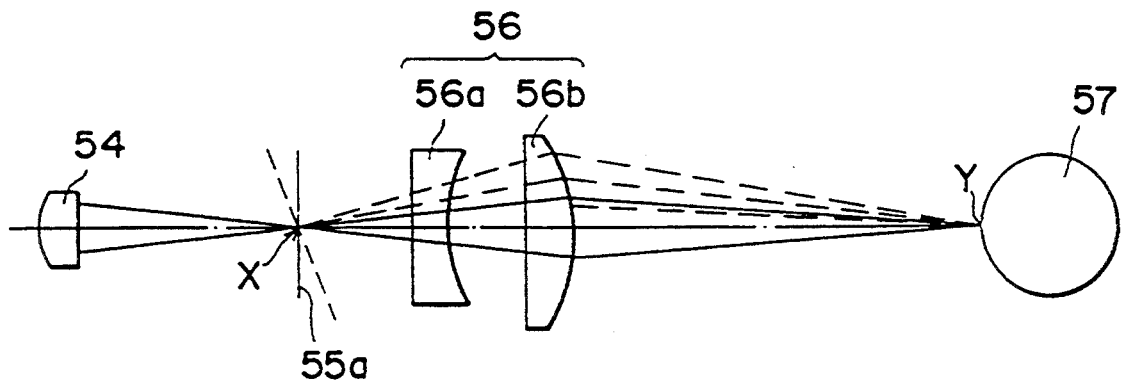
FIG. 2 is a sectional view showing the main part of the conventional optical scanning apparatus in a sub-scanning direction.
Figure 3:
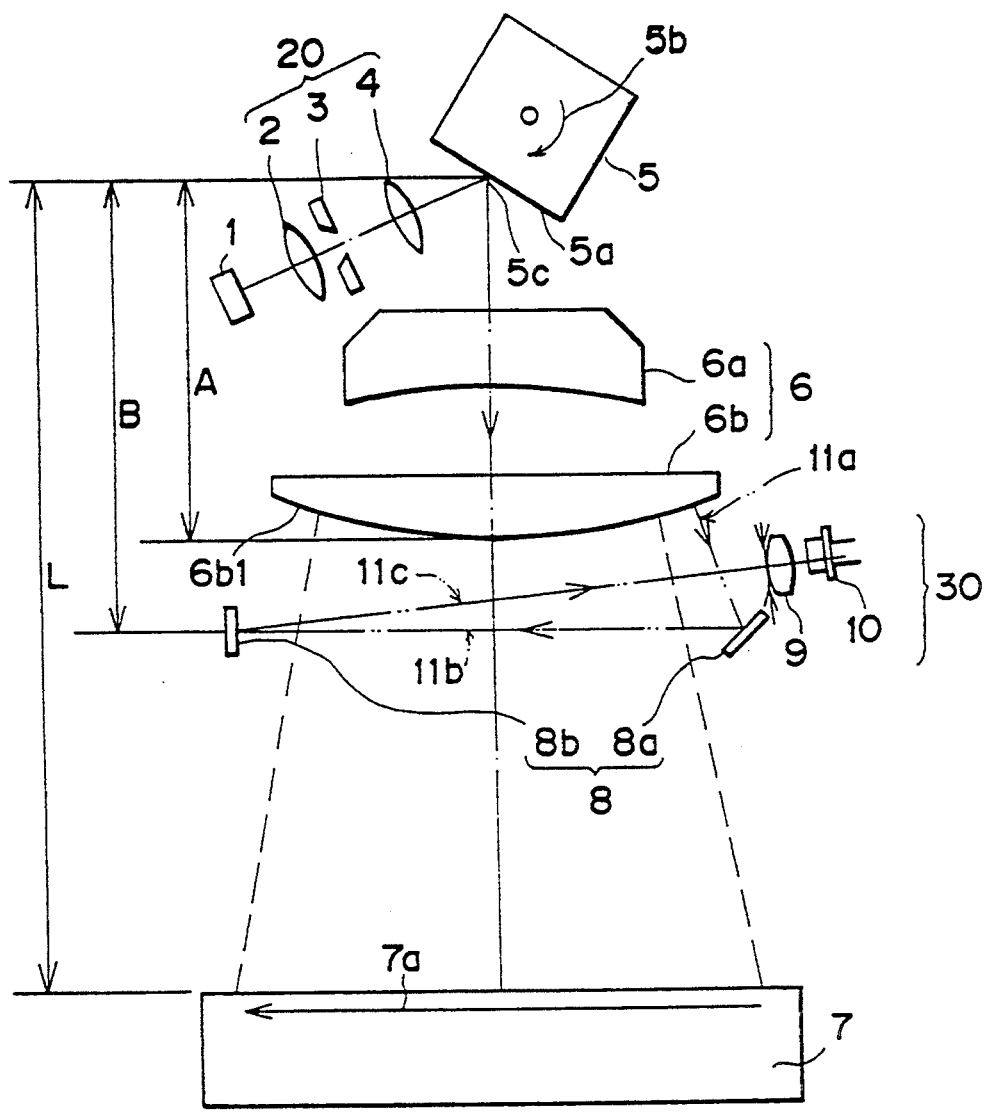
FIG. 3 is a sectional view showing the main part of an optical scanning apparatus according to the first embodiment of the present invention in a main scanning direction.
Figure 4:
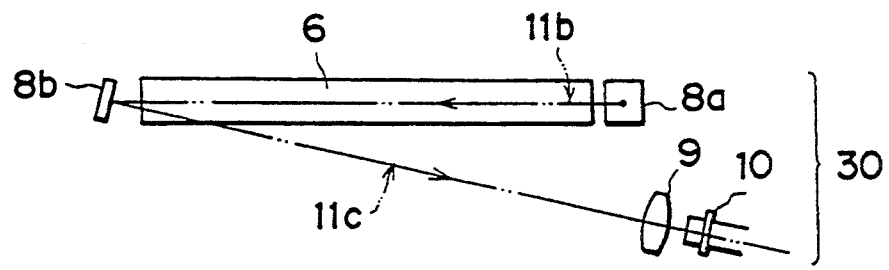
FIG. 4 is a sectional view showing the main part of the optical scanning apparatus according to the first embodiment of the present invention in a sub-scanning direction.

FIG. 3 is a sectional view showing the main part of an optical scanning apparatus according to the first embodiment of the present invention in a main scanning direction. FIG. 4 is a sectional view showing the main part of the optical scanning apparatus according to the first embodiment of the present invention in a sub-scanning direction and shows the optical path of a detecting light beam when viewed from a photosensitive drum 7 side.

Referring to FIGS. 3 and 4, a light source means 1 comprises, e.g., a semiconductor laser. A collimator lens 2 collimates a light beam (beam) emitted from the light source means 1 into a parallel beam. A stop 3 is provided near the collimator lens 2 and regulates the parallel beam passing therethrough. A cylindrical lens 4 has a predetermined refracting power in only the sub-scanning direction perpendicular to the sheet surface of FIG. 3. An optical means 20 is constituted by the collimator lens 2, the stop 3, and the cylindrical lens 4.

An optical deflector 5 serves as a deflecting means having a plurality of reflection surfaces (deflection surfaces). The optical deflector 5 comprises, e.g., a rotary polygon mirror (polygon mirror), and is rotated by a driving means (not shown) such as a motor in a direction indicated by an arrow 5b at a predetermined speed. A focusing optical system (f-$\theta$ lens system) 6 having an f-$\theta$ characteristic serves as a focusing means. The light beam based on the image information and reflected and deflected by the optical deflector 5 is focused by a spherical lens 6a and a toric lens 6b of the focusing optical system 6 to form an image on a photosensitive drum surface 7. The photosensitive drum surface 7 serves as a scanning surface.

A reflecting means 8 comprises fixed first and second reflecting mirrors 8a and 8b. Part of the light beam (detecting light beam) outside the effective image on the photosensitive drum, which has passed through the focusing optical system 6, is incident on a focusing lens 9 (to be described later) by the fixed first and second mirrors 8a and 8b. The incident detecting light beam is guided by the focusing lens 9 onto a detecting means 10 for detecting the scanning start position on the scanning surface 7.

In this embodiment, as shown in FIG. 4, the first reflecting mirror 8a reflects a detecting light beam 11a in a horizontal direction on the sub-scanning section and causes the light beam to be incident on the second reflecting mirror 8b. The second reflecting mirror 8b is inclined downward in FIG. 4 (in the direction of the detecting means 10 side) at a predetermined angle, so that part of the optical path of the light beam has an angle with respect to the main scanning surface where the light beam is optically scanned by the rotating polygon mirror 5. For this reason, the detecting light beam 11c reflected on the second reflecting mirror 8b is efficiently incident on the detecting means 10 without being reflected on an exit surface 6b1 of the toric lens 6b.

The focusing lens 9 is arranged such that its optical axis has an angle with respect to the main scanning surface. The focusing lens 9 focuses the detecting light beam 11c from the reflecting means 8 and causes the light beam 11c to be incident on the detecting means 10. The detecting means (detecting sensor) 10 is arranged at an angle with respect to the main scanning surface as the focusing lens 9. The detecting means 10 detects part of the detecting light beam reflected on each reflection surface of the optical deflector 5 to control the timing of the scanning start position on the photosensitive drum surface 7 before optical scanning on the photosensitive drum surface 7. The timing of the scanning start position for image recording onto the photosensitive drum surface 7 is controlled by using a signal obtained from the detecting means 10.

The reflecting means 8, the focusing lens 9, and the detecting means 10 constitute one element of a synchronous detecting system.

In this embodiment, the light beam (scattering light beam) emitted from the light source means 1 is collimated by the collimator lens 2 into the parallel beam. The light beam (light amount) is regulated by the stop 3, and the light beam is incident on the cylindrical lens 4 having a refracting power only in the sub-scanning direction.

Part of the parallel beam incident on the cylindrical lens 4 emerges in the parallel beam state from the main scanning surface where the light beam is deflected and scanned. The light beam is focused on the sub-scanning surface perpendicular to the main scanning surface to form a substantially linear image on the reflection surface 5a of the optical deflector 5. The light beam reflected and deflected on the reflection surface 5a of the optical deflector 5 passes through the area (effective image area) within the dotted line indicated in FIG. 3 through the focusing optical system (f-θ lens system) 6, and is guided onto the photosensitive drum surface 7. When the optical deflector 5 is rotated in the direction indicated by the arrow 5b, optical scanning is performed on the photosensitive drum surface 7 in a direction indicated by an arrow 7a.

At this time, in this embodiment, the timing of the scanning start position is adjusted by using the following method before optical scanning on the photosensitive drum surface 7.

As shown in FIG. 4, the detecting light beam 11b reflected on the first reflecting mirror 8a is reflected in the horizontal direction on the sub-scanning section to be incident on the second reflecting mirror 8b. The second reflecting mirror 8b is inclined downward, as shown in FIG. 4, at a predetermined angle. The detecting light beam 11c reflected on the second reflecting mirror 8b is thus reflected downward in FIG. 4 and incident on the detecting means 10 through the focusing lens 9.

The timing of the scanning start position for image recording onto the photosensitive drum surface 7 is adjusted by using a signal obtained from the detecting means 10.

In this embodiment, the detecting light beam 11c incident on the focusing lens 9 on the main scanning section shown in FIG. 3 passes near the exit surface 6b1 of the toric lens 6b. However, on the sub-scanning section shown in FIG. 4, the light beam 11c keeps some distance (difference) from the toric lens 6b.

That is, in this embodiment, at least part of the optical path of the detecting light beam passing through the reflecting means 8 has an angle with respect to the main scanning surface to form a three-dimensional optical path. Therefore, even if the detecting light beam has a scanning width on the main scanning section shown in FIG. 3, the stray light reflected on the exit surface 6b1 of the toric lens 6b does not generate ghost light on the photosensitive drum surface 7, or is not incident on the detecting means 10 to be detected as a spurious signal.

In this embodiment, each optical element is set such that the following condition is satisfied:

$$0 < (B-A)/L < 0.2 \qquad (1)$$

where L is the distance from a deflection point (reflection position) 5c of the optical deflector 5 to the photosensitive drum surface 7 along the direction of the optical axis of the focusing optical system 6, A is the distance from the deflection point 5c to the lens surface 6b1 of the focusing optical system 6 at the position closest to the photosensitive drum surface 7, and B is the maximum distance from the deflection point 5c to the reflecting means 8 is B.

The condition (1) defines the positional relationship of the optical elements, i.e., the optical deflector 5, the focusing optical system 6, the reflecting means 8, and the photosensitive drum 7.

When each optical element is set to have a value smaller than the lower limit value of condition (1), the detecting light beam is turned back halfway in the focusing optical system 6 or just before the focusing optical system 6, so that scattering or stray light is undesirably incident on the photosensitive drum surface 7.

When each optical element is set to have a value larger than the upper limit value of condition (1), the length of the optical path from the reflecting mirror to the focusing optical system 6 is elongated, undesirably resulting in a bulky apparatus.

As described above, in this embodiment, when the synchronous detecting system 30 is appropriately constituted, and the above condition (1) is satisfied, an arrangement in which the detecting light beam is hardly reflected on the lens surface can be obtained to effectively prevent stray light from being generated.

Even if some scattering or stray light is generated, a substantial and direct influence can be prevented because many obstacles are present on the path to the photosensitive drum surface 7, thereby allowing high-precision optical scanning.

Figure 5:
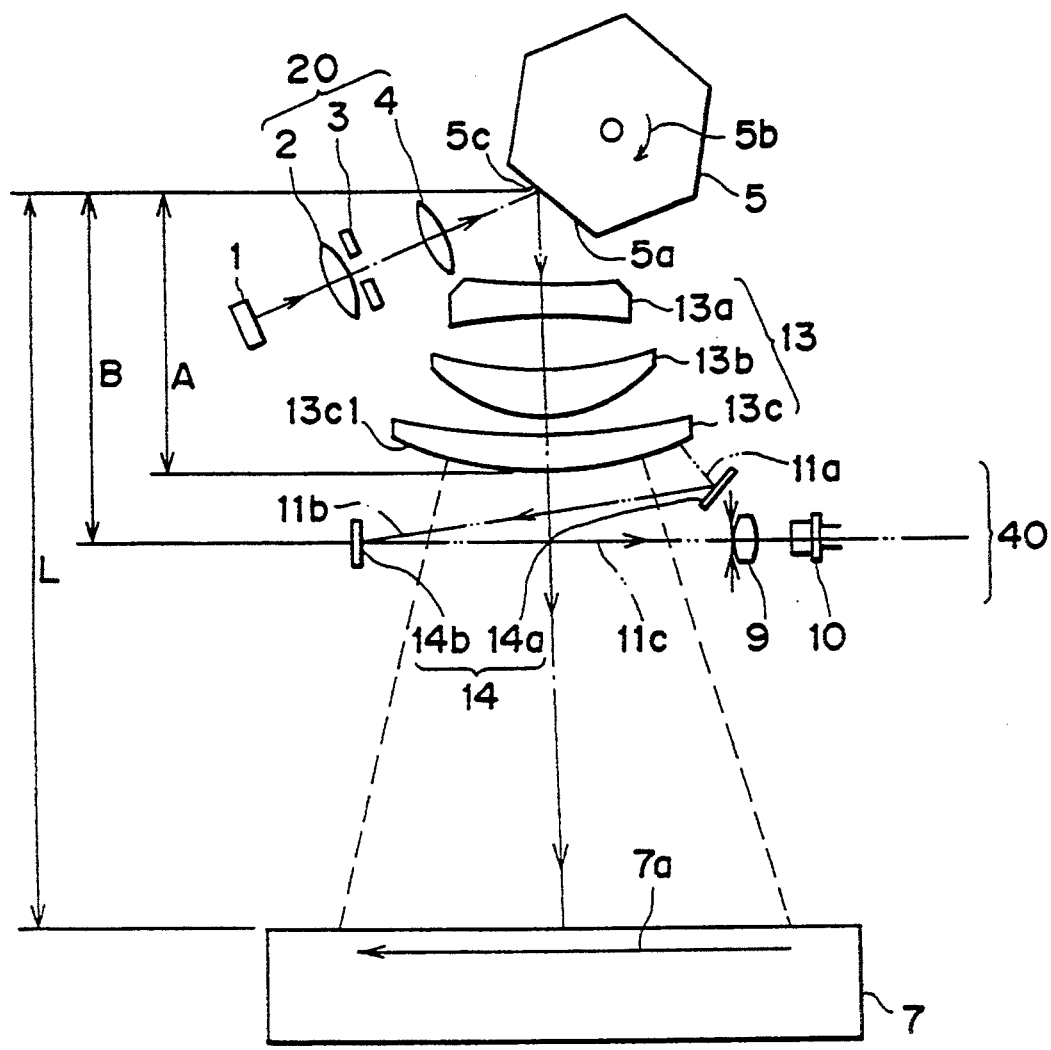
FIG. 5 is a sectional view showing the main part of an optical scanning apparatus according to the second embodiment of the present invention in a main scanning direction.
Figure 6:
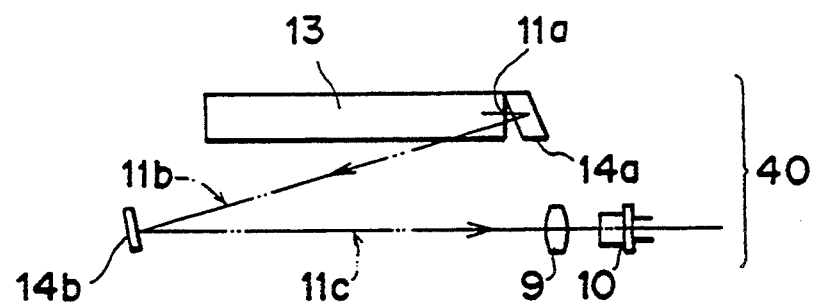
FIG. 6 is a sectional view showing the main part of the optical scanning apparatus according to the second embodiment of the present invention in a sub-scanning direction.

FIG. 5 is a sectional view showing the main part of an optical scanning apparatus according to the second embodiment of the present invention in a main scanning direction, and FIG. 6 is a sectional view showing the main part of the optical scanning apparatus in a sub-scanning direction and shows the optical path of a detecting light beam when viewed from a photosensitive drum 7 side. The same reference numerals as in FIGS. 3 and 4 denote the same parts in FIGS. 5 and 6, and a detailed description thereof will be omitted.

A focusing optical system 13 having an f-θ characteristic comprises spherical lenses 13a and 13b and a toric lens 13c.

The second embodiment is different from the first embodiment in that the reflection angles and positions of first and second reflecting mirror 14a and 14b constituting a reflecting means 14 are changed and, accordingly, the positions of a focusing lens 9 and a detecting means 10 are changed, thereby constituting a synchronous detecting system 40. The other optical elements and functions are almost same as in the first embodiment.

More specifically, in this embodiment, as shown in FIG. 6, the first reflecting mirror 14a is inclined downward in FIG. 6 at a predetermined angle with respect to the main scanning surface. A detecting light beam 11b reflected on the first reflecting mirror 14a is thus reflected downward in FIG. 6 to be incident on the second reflecting mirror 14b. A light beam 11a emitted from the toric lens 13c is incident on the first reflecting mirror 14a.

The second reflecting mirror 14b is inclined upward in FIG. 6 at a predetermined angle. A detecting light beam 11c reflected on the second reflecting mirror 14b is thus reflected horizontally to the main scanning surface to be efficiently incident on the detecting means 10 through the focusing lens 9.

That is, some mirrors constituting the reflecting means 14 are arranged at an angle with respect to the main scanning surface as in the first embodiment, such that the optical path of the light beam from the focusing optical system 13 to the detecting means 10 forms a three-dimensional optical path, and the position of each optical element is set such that condition (1) is satisfied.

With the above arrangement, as in the first embodiment, reflection of the detecting light beam on an exit surface 13c1 of the toric lens 13c is minimized, and the detecting light beam can be efficiently guided to the detecting means 10. In addition, no ghost light is generated on the photosensitive drum surface 7 to perform high-precision optical scanning.

In an optical scanning apparatus having a long distance (optical path length) from the focusing optical system to the scanning surface, the optical path of the synchronous detecting system is accordingly elongated. In such an optical system, the synchronous detecting system need to be constituted by using a plurality of reflecting mirrors. However, when the synchronous detecting system is appropriately constituted as in this embodiment, an optical scanning apparatus providing a great effect of the synchronous detecting system can be obtained.

When the optical scanning apparatus of the present invention is applied to a laser beam printer, high-precision optical scanning can be performed, and a compact apparatus can be obtained.

According to the present invention, as described above, when a synchronous detecting system having at least a reflecting means comprising a plurality of reflecting mirrors, a focusing lens, and a detecting means for detecting a scanning start position is appropriately constituted, and each element is arranged such that condition (1) is satisfied, reflection of a detecting light beam on the lens surface of a focusing optical system can be efficiently prevented, thereby realizing a compact optical scanning apparatus capable of performing high-precision optical scanning without being influenced by ghost light or a spurious signal.

What is claimed is:

1. An optical scanning apparatus comprising:
 light source means for generating a light beam;
 deflecting means for deflecting the light beam from said light source means;
 an optical system for focusing the light beam deflected by said deflecting means onto a scanning surface;
 reflecting means for reflecting the light beam from said optical system, said reflecting means reflecting the light beam to have an angle with respect to a main scanning surface; and
 detecting means for detecting the light beam reflected by said reflecting means,
 wherein the following condition is satisfied:

$$0 < (B-A)/L < 0.2$$

where L is a distance from a deflection point of said deflecting means to said scanning surface along a direction of an optical axis of said optical system, A is a distance from said deflection point to a lens surface of said optical system at a position closest to said scanning surface, and B is a maximum distance from said deflection point to said reflecting means.

2. An apparatus according to claim 1, wherein said reflecting means has a plurality of reflecting mirrors disposed in an optical path between said optical system and said detecting means.

3. An apparatus according to claim 1, wherein said optical scanning apparatus is used in a laser beam printer.

4. An optical scanning apparatus comprising:
 light source means for generating a light beam;
 deflecting means for deflecting the light beam from said light source means;
 an optical system for focusing the light beam deflected by said deflecting means onto a scanning surface;
 reflecting means for reflecting the light beam from said optical system, said reflecting means having a plurality of reflecting mirrors; and
 detecting means for detecting the light beam reflected by said reflecting means,
 wherein the following condition is satisfied:

$$0 < (B-A)/L < 0.2$$

where L is a distance from a deflection point of said deflecting means to said scanning surface along a direction of an optical axis of said optical system, A is a distance from said deflection point to a lens surface of said optical system at a position closest to said scanning surface, and B is a maximum distance from said deflection point to said reflecting means.

5. An apparatus according to claim 4, wherein said optical scanning apparatus is used in a laser beam printer.

6. A laser beam printer comprising:
 light source means for generating a light beam;
 deflecting means for deflecting the light beam from said light source means;
 a photosensitive member;
 an optical system for focusing the light beam deflected by said deflecting means onto said photosensitive member;
 reflecting means for reflecting the light beam from said optical system, said reflecting means reflecting the light beam to have an angle with respect to a main scanning surface; and detecting means for detecting the light beam reflected by said reflecting means, wherein the following condition is satisfied:

$$0 < (B-A)/L < 0.2$$

where L is a distance from a deflection point of said deflecting means to said photosensitive member along a direction of an optical axis of said optical system, A is a distance from said deflection point to a lens surface of said optical system at a position closest to said photosensitive member, and B is a maximum distance from said deflection point to said reflecting means.

7. A laser beam printer according to claim 6, wherein said reflecting means has a plurality of reflecting mirrors disposed in an optical path between said optical system and said detecting means.

8. A laser beam printer comprising:

light source means for generating a light beam;

deflecting means for deflecting the light beam from said light source means;

a photosensitive member;

an optical system for focusing the light beam deflected by said deflecting means onto said photosensitive member;

reflecting means for reflecting the light beam from said optical system, said reflecting means having a plurality of reflecting mirrors; and detecting means for detecting the light beam reflected by said reflecting means, wherein the following condition is satisfied:

$$0 < (B-A)/L < 0.2$$

where L is a distance from a deflection point of said deflecting means to said photosensitive member along a direction of an optical axis of said optical system, A is a distance from said deflection point to a lens surface of said optical system at a position closest to said photosensitive member, and B is a maximum distance from said deflection point to said reflecting means.

* * * * *